United States Patent [19]

Pollack

[11] E Patent Number: Re. 32,820

[45] Reissued Date of Patent: Jan. 3, 1989

[54] ELECTRIC CORD HOLDER ASSEMBLY

[76] Inventor: Ronald M. Pollack, 73-19 37th Rd., Jackson Heights, N.Y. 11372

[21] Appl. No.: 98,927

[22] Filed: Sep. 21, 1987

Related U.S. Patent Documents

Reissue of:

[64] Patent No.: 4,563,542
Issued: Jan. 7, 1986
Appl. No.: 557,241
Filed: Dec. 2, 1983

U.S. Applications:

[63] Continuation-in-part of Ser. No. 443,037, Nov. 19, 1982, Pat. No. 4,454,374, which is a continuation-in-part of Ser. No. 323,651, Nov. 20, 1981, abandoned.

[51] Int. Cl.[4] ..... H02G 3/04

[52] U.S. Cl. ..... 174/68.3; 174/72 C

[58] Field of Search ..... 174/48, 49, 68 C, 70 C, 174/72 C, 84 S, 97, 101; 138/157-163; 285/64, 121; 52/220, 221, 273, 287, 288, 465, 469, 470, 716, 717, 718; D13/13; D25/75, 79

[56] References Cited

U.S. PATENT DOCUMENTS

| | | | |
|---|---|---|---|
| 1,528,147 | 3/1925 | Durkee | D25/79 X |
| 4,055,930 | 11/1977 | Weinar et al. | 52/717 |
| 4,096,349 | 6/1978 | Donato | 174/48 X |
| 4,258,515 | 3/1981 | Owen | 174/68 C X |
| 4,454,374 | 6/1984 | Pollack | 174/68 C |
| 4,602,124 | 7/1986 | Santucci | 174/101 |

FOREIGN PATENT DOCUMENTS

| | | | |
|---|---|---|---|
| 950028 | 3/1949 | France | 174/97 |
| 1368536 | 6/1964 | France | 174/70 C |
| 44703 | 4/1966 | German Democratic Rep. | 174/72 C |

OTHER PUBLICATIONS

*"La-in" Catalog and Handbook*, published by National Electric Products Corporation, Pittsburgh, PA, 1938, pp. 31-35 and 60.

*Primary Examiner*—Laramie E. Askin
*Attorney, Agent, or Firm*—Collard, Roe & Galgano

[57] ABSTRACT

There is provided an electric cord holder assembly composed of a connecting element for interconnecting the adjacent ends of two electric cord holders to present an aesthetically pleasing continuous electric cord holder. The connecting element is provided with a dome-shaped configuration corresponding with the dome-shaped configuration of the electric cord holders and is further provided with bosses on the ends thereof which engage with the ends of the dome-shape of the electric cord holders. When in place, the connecting elements engage with the electric cord holders at their adjacent ends to cover any space therebetween.

10 Claims, 3 Drawing Sheets

FIG.1
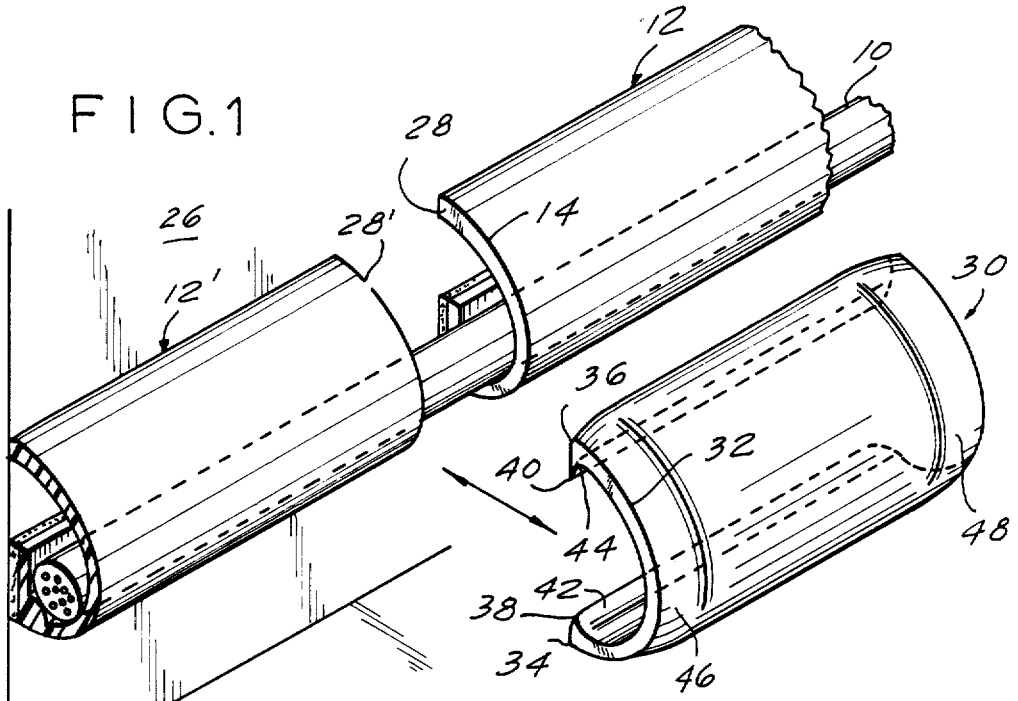
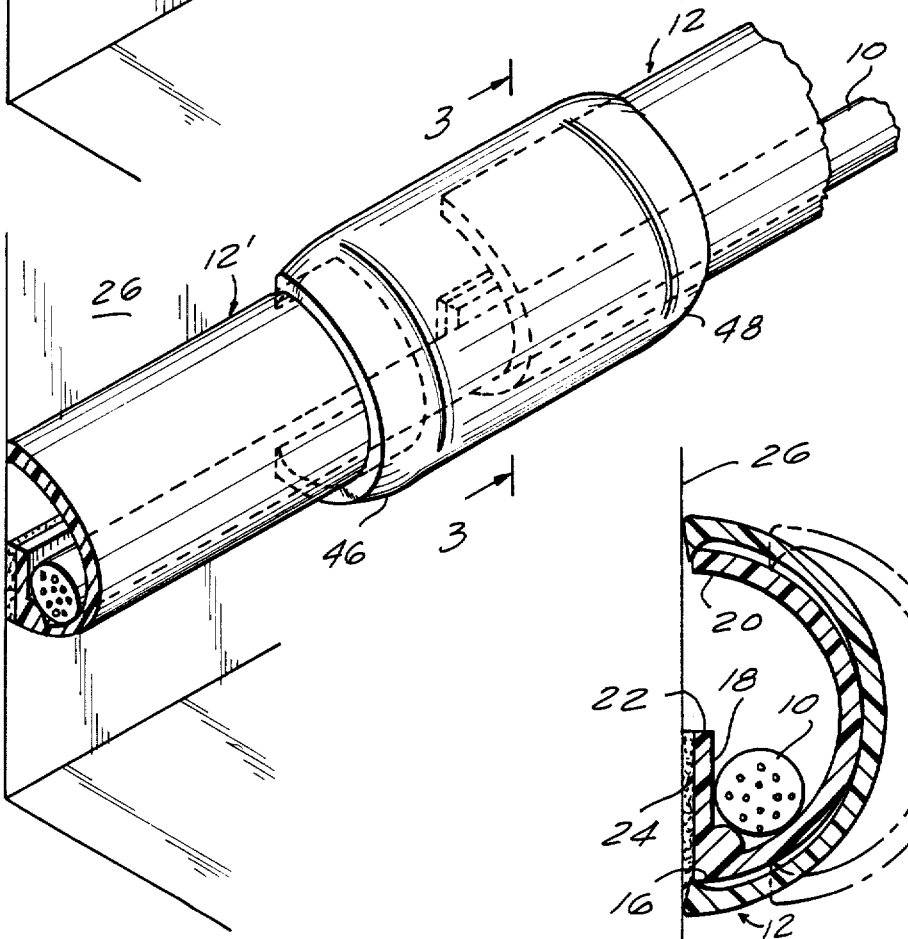
FIG. 2
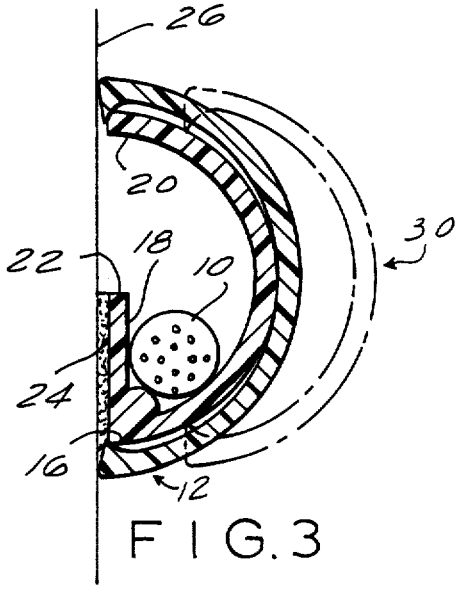
FIG. 3

ELECTRIC CORD HOLDER ASSEMBLY

Matter enclosed in heavy brackets [ ] appears in the original patent but forms no part of this reissue specification; matter printed in italics indicates the additions made by reissue.

This is a continuation-in-part of U.S. Patent Application Ser. No. 443,037, filed Nov. 19, 1982, now U.S. Pat. No. 4,454,374, which in turn is a continuation-in-part of U.S. Patent Application Ser. No. 323,651, filed Nov. 20, 1981, now abandoned.

The present invention relates generally to an electric cord holder assembly for the purpose of covering or concealing unsightly hanging electric cords for electric appliances and maintaining such cords securely held against a surface such as a wall. More particularly, the present invention relates to an electric cord holder assembly composed of a connecting element and two or more electric cord holder sections as described in the above-identified applications. The invention provides an aesthetic covering for electric cords for electric appliances where discontinuities in the cord holder sections are required.

In my earlier filed applications identified above, I have disclosed an electric cord holder and cover which aesthetically covers or conceals unsightly hanging electric cords for electric appliances. Generally, electric appliances in the home and sometimes in office surroundings are positioned away from electrical wall outlets so that it is often necessary that the electric cords for such appliances are visible when they are electrically connected to the wall outlets. The electric cord holder and cover described in my earlier filed applications provides an aesthetic, efficient and inexpensive means for covering or concealing such unsightly electric cords and firmly securing such cords to surfaces such as walls, floors, etc. The electric cord holder and cover described therein includes an elongated plastic extrusion of basically tubular shape having a cross-section in the form of a substantially C-shaped portion one end of which including an overhang and a substantially planar portion extending inwardly from the end of the C-shaped portion opposite the end having the overhang towards the other end of the C-shaped portion having the overhang thus leaving a slot therebetween adapted for insertion of the electrical cord. Further included is a securing strip of predetermined width forming the outer surface of said planar portion. The securing strip is adapted to be adhered to a wall or floor surface to thereby secure the electric cord holder and cover having the electric cord therein to the wall or floor surface. The overhang of the one end of the C-shaped portion extends outwardly to the plane defined by the planar surface extending from the other end of the C-shaped portion so as to be flush with the wall or floor surface when so secured.

It has been found that such an electric cord holder serves the purpose of which it is intended very satisfactorily. However, some disadvantages have been encountered. It has been found that in situations where it is necessary that the electric cord extend between discontinuous surfaces such as in the corner of a room or where a wall meets the floor, it is often necessary to miter the ends of two lengths of electric cord holders so that an aesthetic appearance is maintained in such areas. Also, it has been found that when there is an exceptionally long electric cord requiring more than one cord holder, it is often necessary to take care in abutting the ends of the cord holders in order to preserve an aesthetic appearance. It has also been found that in other situations where a plurality of electric cords emanating from different electrical appliances are to be joined in a single electric cord holder, in order to maintain the aesthetic appearance it was often necessary to expend an excessive amount of effort in joining such electric cord holders so as to maintain such appearance. In all of the above noted cases, as well as others which have not herein been discussed, it has been found necessary for the installer of the electric cord holder according to the invention described in my earlier filed applications, whether he be a layman or an expert in the field, in order to preserve the aesthetic appearance desired in utilizing such an electric cord holder, to expend additional effort and time over and above that which should be necessary.

It is, therefore, an object of the present invention to provide an electric cord holder assembly which has the effect of preserving the aesthetic appearance and ease of installation of the cord holder in situations where such cord holders are discontinuous, such as where the surface to which the cord holder is attached is discontinuous as between adjoining walls or where a wall and a floor meet or where the ends of two cord holders come together.

This object, as well as others which will hereinafter become apparent, is accomplished in accordance with the present invention by the provision of an electric cord holder connecting element to be used together with an electric cord holder and cover as described in my earlier filed patent applications as described above. Such an element is constructed of plastic, having a substantially C-shaped cross-section adapted to fit over the substantially C-shaped cross-section of the above described electric cord holder and is provided at its ends with inwardly extending projections or bosses which may extend longitudinally for the length of the element. The element is thus adapted because of its resilient, spring-like nature to be positioned over an electric cord holder as described and snapped into a position such that the inwardly protruding bosses engage the ends of the C-shaped cross-section of the holder. By the utilization of such an element, therefore, it is possible to interconnect the adjacent ends of two such electric cord holders so as to provide a continuous appearance to the interrupted electric cord holder. An embodiment of such an element can be utilized in situations in which the electric cord holders as above described are positioned in a non-linear discontinuous manner such as where two walls come together or where a wall and a floor come together or where a ceiling and a wall come together. In such cases, the elements are provided with non-linear portions or segments which correspond to the discontinuities of the adjoining electric cord holders. In another embodiment of the present invention an electric cord holder connecting element is provided for interconnecting the ends of two adjacent electric cord holders which are secured to a discontinuous surface and which is adjustable to accommodate differing angular positions between the surfaces. Since in all cases the electric cord holder connecting element of the present invention may be utilized together with the electric cord holder according to my earlier filed applications, the subject matter thereof is incorporated herein and made a part hereof by reference.

The present invention will be described and understood more readily when considered together with the embodiments shown in the accompanying drawings, in which:

FIG. 1 is a partly exploded perspective view showing the ends of two adjacent electric cord holders positioned on a planar surface and an electric cord holder connecting element according to the present invention before emplacement thereon;

FIG. 2 is a perspective view similar to FIG. 1 showing the electric cord holder connecting element in place;

FIG. 3 is a cross-sectional view taken along line 3—3 of FIG. 2;

Figure 4:
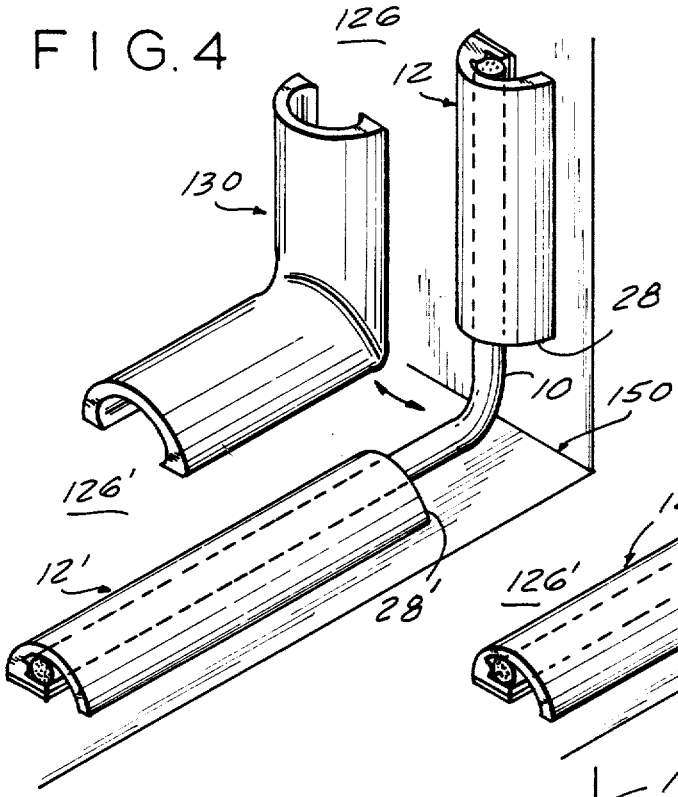
FIG. 4 is a partly exploded perspective view of another embodiment of the electric cord holder connecting element of the present invention prior to emplacement interconnecting the ends of two adjacent electric cord holders attached to discontinuous surfaces.

Now turning to the drawings, there is shown in FIG. 1 an electrical cord, designated 10, such as is generally found in the home or office which is generally connected to an electrical appliance (not shown) and the other end of which is generally plugged into an electrical wall outlet (not shown). In order to cover or conceal the unsightliness of electrical cord 10 and also for the purpose of holding the cord, electric cord holder and covers, designated 12 and 12', are utilized. Electric cord holder and covers 12 and 12' are identical to each other in all respects and, therefore, a description of one shall suffice to describe the other. Thus, electric cord holder 12 consists of an elongated plastic extrusion having a substantially C-shaped or dome-shaped form, designated 14, as seen in an end view or cross-sectional view of the electric cord holder. As seen in FIG. 3, one end, designated 16, of the C-shaped form 14 is provided with an inwardly extending planar surface, generally designated 18, which extends toward the other end, designated 20, of the C-shaped form 14 and defines an electrical cord insertion slot, designated 22, therebetween. The end 20 of C-shaped form 14 is provided with an overhang so that it substantially extends to the plane defined by planar surface 18. Planar surface 18 of the electric cord holder is provided with a securing strip, designated 24, of adhesive material which may extend along the width and breadth of planar surface 18. As clearly seen in FIGS. 1 and 3, electric cord 10 is inserted through the electric cord receiving slot 22 of the electric cord holder and the electric cord holder 12 or 12' is pressed against a surface such as wall surface 26 and is adhered thereto by means of securing strip 24.

As clearly seen in FIG. 1, where two electric cord holders 12 and 12' are utilized in succession, their adjacent ends, designated 28 and 28', respectively, are likely to be spatially separated unless extreme care is taken to eliminate any discontinuity between the two electric cord holders. In order to obviate this problem, the electric cord holder connecting element of the present invention, generally designated 30, is provided. As clearly seen in FIGS. 1 to 3, connecting element 30 is provided with a generally C-shaped or dome-shaped configuration, designated 32, which generally comports or corresponds with the C-shaped form 14 of the electric cord holder. The ends, designated 34 and 36, of the C-shaped configuration 32 of element 30 are provided with bosses 38 and 40, respectively, which extend inwardly towards each other. Connecting element 30 is so dimensioned as to fit over the C-shaped form 14 of the electric cord holder so that its ends 34 and 36 extend just beyond the ends 16 and 20 of C-shaped form 14. The spatial distance between bosses 38 and 40 is slightly less than the width of the electric cord holder, as clearly demonstrated in FIG. 3 where the connecting element is shown prior to emplacement in phantom. With such a configuration, element 30 may be positioned over the space established between the ends 28 and 28' of electric cord holders 12 and 12' and pressed or snapped into the position shown clearly in FIGS. 2 and 3 where bosses 38 and 40 engage with ends 16 and 20 of the electric cord holders. In order to accomplish this, it is necessary that either or both connecting element 30 and the electric cord holders be provided with resilient walls. Preferably, connecting element 30 is formed of a plastic material which inherently is provided with resiliency and memory. In order to ensure a proper fit of connecting element 30 over the C-shaped form 14 of the electric cord holder, it is necessary that the inside diameter or radius of element 30 be no greater than the outside diameter or radius of C-shaped form 14 and preferably less than this dimension.

For the purpose of facilitating the connecting and removal of connecting element 30 with and from engagement with electric cord holders 12 and 12', the inner sides of bosses 38 and 40 are provided with a taper or cammed surfaces 42 and 44 which permit a releasable locking engagement with the ends 16 and 20 of the electric cord holder. In addition, for aesthetic appearances, the ends 46 and 48 of connecting element 30 are beveled.

It is also possible to provide other engagement means than bosses 38 and 40, such as, for instance, a saw-toothed configuration, a series of nubs along the inner surface of connecting element 30 or any other means which ensures engagement.

Figure 5:
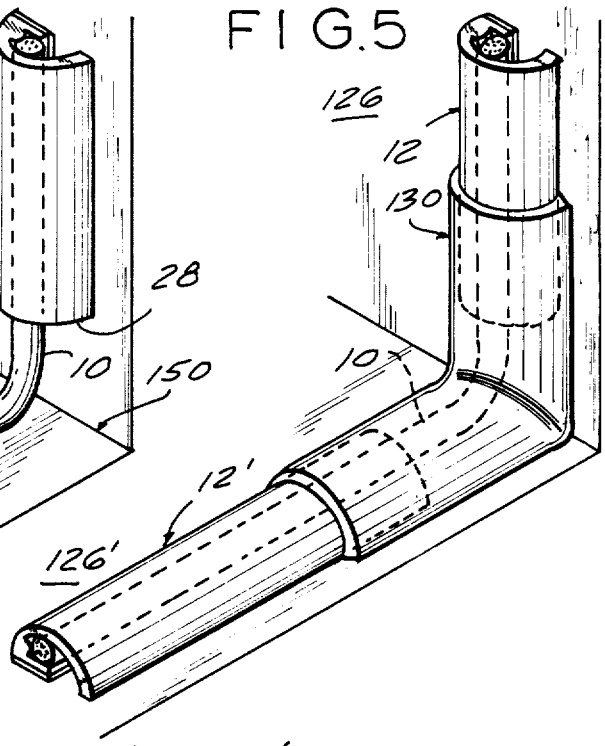
FIG. 5 is a perspective view similar to that of FIG. 4 showing the electric cord holder connecting element in place.

In FIGS. 4 and 5 there is shown another embodiment of the electric cord holder and cover connecting element according to the present invention, generally designated 130. As clearly seen, the electric cord holders 12 and 12' are positioned on discontinuous surfaces, designated 126 and 126', which meet at a corner, generally designated 150. Such may be the situation in the corner of a room where two adjacent walls meet or where a wall meets the floor or ceiling of a room. In such a situation, connecting element 130 is provided with a non-linear discontinuous configuration along its length which substantially corresponds with the 90° angle of corner 150. Preferably, the angle between the two segments of element 130 is slightly greater than 90°, preferably 93°, which permits greater flexibility of use since the corners of walls are usually greater than 90°. By the use of such an element 130, which is snapped into engagement with electric cord holders 12 and 12' in the same manner as such engagement is accomplished in accordance with the embodiment described in connection with FIGS. 1 to 3, it is possible to eliminate the need for mitering the adjacent ends 28 and 28' of electric cord holders 12 and 12'. Thus, as clearly seen in FIG. 5, when connecting element 130 is in place on electric cord holders 12 and 12' covering the space between ends 28 and 28', an aesthetically appealing continuous electric cord holder and cover is provided.

Figure 6:
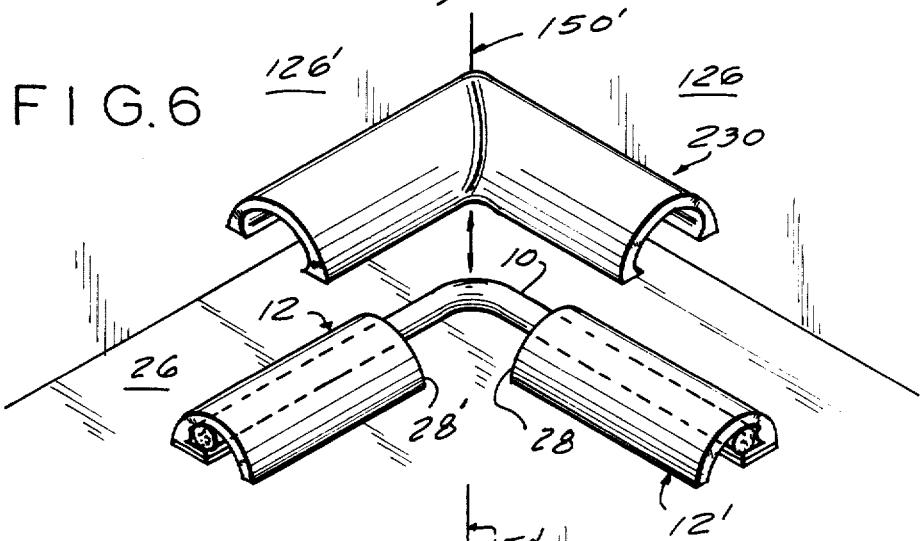
FIG. 6 is a partly exploded perspective view of another embodiment of the electric cord holder connecting element according to the present invention prior to emplacement interconnecting the two ends of adjacent electric cord holders positioned angularly with respect to each other.
Figure 7:
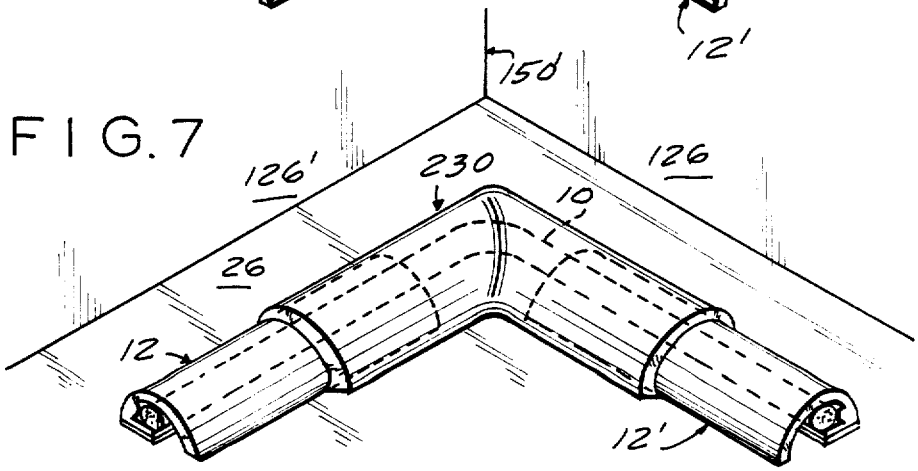
FIG. 7 is a perspective view similar to that of FIG. 6 showing the electric cord holder connecting element in place.

Another embodiment of the electric cord holder connecting element is shown in FIGS. 6 and 7 where it is necessary for electric cord 10 to change direction on a planar surface 26 as where cord 10 is placed on the floor of a room at or near a corner 150' defined by wall surfaces 126 and 126'. In such a case, an electric cord holder connecting element 230 is provided having a non-linear planar configuration corresponding to corner 150'. Thus, as clearly seen in FIG. 7 when connecting element 230 is in place engaging with the adjacent ends 28 and 28' of electric cord holders 12 and 12', an aesthetically pleasing continuous electric cord holder and cover is again provided.

Figure 8:
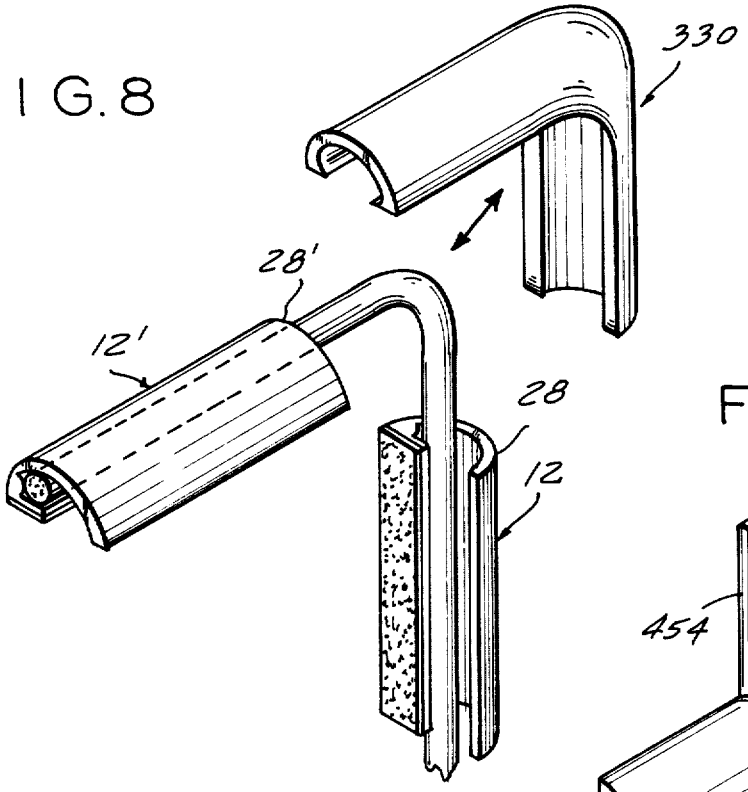
FIG. 8 is a partly exploded perspective view of yet another embodiment of the electric cord holder connecting element according to the present invention prior to emplacement interconnecting the adjacent ends of two electric cord holders attached to discontinuous surfaces.
Figure 9:
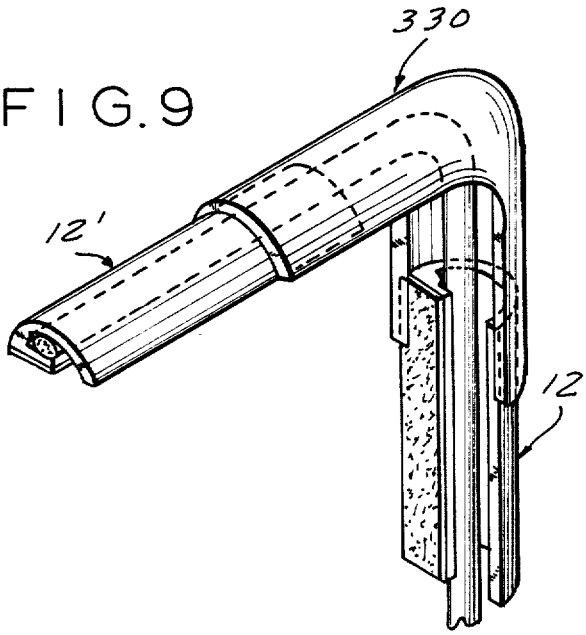
FIG. 9 is a perspective view similar to that of FIG. 8 showing the electric cord holder connecting element in place.

In FIGS. 8 and 9, another embodiment of the electric cord holder connecting element is shown, designated 330, which is utilized in a situation where the surfaces to which electric cord holders 12 and 12' are connected are discontinuous but unlike the corner shown in FIGS. 4 and 5, in this case the corner forms an angle of 270° rather than 90°. Again, as seen in FIG. 9, when connecting element 330 is in place engaging the ends 28 and 28' of electric cord holders 12 and 12', an aesthetically pleasing appearance is imparted to the corner encountered by the electric cord holder without the need for mitering the ends 28 and 28'.

Figure 10:
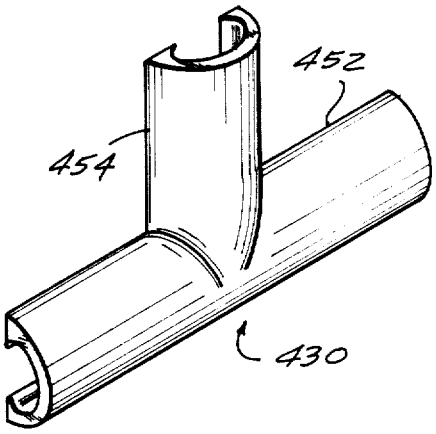
FIG. 10 is a perspective view of another embodiment of the electric cord holder connecting element according to the present invention utilized when two electric cords are run together.

In FIG. 10, yet another embodiment of the electric cord holder connecting element of the present invention, designated 430, is shown. Connecting element 430 is T-shaped and may be utilized in a situation where two electric cords emanating from different sources are encased in separate electric cord holders which meet at a 90° angle and thereafter the electric cords are run together. Thus, connecting element 430 is provided with one continuous segment, designated 452, and a second segment, designated 454, which intersects segment 452 at a 90° angle and which may be in the same plane as segment 452. Thus, again when such a connecting element 430 is utilized in an appropriate situation, an aesthetically pleasing result is achieved.

Figure 11:
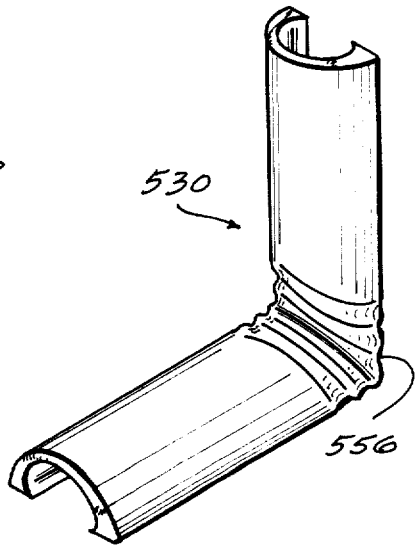
FIG. 11 is a perspective view of another embodiment of the electric cord holder connecting element of the present invention for use with discontinuous surfaces.

In FIG. 11, there is shown still another embodiment of the electric cord holder connecting element of the present invention, designated 530, which may be utilized in situations where the surfaces to which the electric cord holders are adhered are non-linear and non-continuous, such as is described in connection with the embodiment shown in FIGS. 4 and 5. In addition, connecting element 530 may also be utilized in situations where the electric cord holders are positioned on a linear surface such as is described in connection with the embodiments shown in FIGS. 1 to 3. Thus, connecting element 530 is provided along its length, preferably near its center portion with a flexible segment designated 556. Flexible segment 556 may be accordion-like in order to impart flexibility thereto. As indicated, such a connecting element 530 may be utilized in various corner arrangements in which the electric cord holder is used.

In cases where the connecting element is provided with a bend, e.g., as shown in the embodiments of FIGS. 4 and 8, it is preferable to provide a rounded edge to the bend to thereby increase the flexibility thereat. Also, it is preferable in the non-linear connecting elements to have the engagement bosses extend only in the end regions of the elements rather than throughout their length. These features permit the user to enlarge the angle of the bend of the connecting element to conform to the exact angle of the corner which is typically not a pefect 90° (for example, it could be between 88°–97°).

It is to be understood that the foregoing general and detailed descriptions are explanatory of the present invention and are not to be interpreted as restrictive of the scope of the following claims.

What is claimed is:

1. An electric cord holder assembly, comprising:

at least two electric cord holder sections attachable to a surface and having ends disposable adjacent one another, each section comprising a *one-piece* sheath made of an elongated plastic extrusion having [a slotted tubular cross-section so as to define] a cord-receiving channel therein, said sheath having an arcuate dome-shaped resilient front wall having two ends [and an overhang on one end thereof] and a planar rear wall [extending from the other end of said front wall towards said one end of said front wall, said rear wall having a free end leaving a slot adapted for insertion of an electrical cord into said cordreceiving channel between said free end of said rear wall and said one end of said front wall], said rear wall having an inner face which partially defines said cord-receiving channel and an outer face, and securing means composed of an adhesive strip of predetermined width having a generally planar outer surface connected to said outer face of said rear wall and adapted to be attached to a surface, and a plastic connecting element for interconnecting adjacent ends of said sections and covering the space therebetween comprising an elongated segment having an arcuate dome-shaped resilient wall which substantially corresponds with the arcuate dome-shaped front [wall] *walls* of said sheaths so as to fit thereover and having at least two ends each of which is provided with bosses extending towards each other, said bosses defining therebetween a space smaller than the width of said arcuate dome-shaped front walls of said sheaths, said bosses being adapted to engage underneath said ends of said arcuate dome-shaped front walls of said sheaths, said bosses including camming surfaces disposed on their inner sides, and said camming surfaces providing a releasable locking engagement between said connecting element and said sections when said connecting element is pressed thereover so that no discontinuity occurs between the adjacent ends of said electric cord holder sections.

2. The electric cord holder assembly according to claim 1, wherein each camming surface has a concave arcuate profile.

3. The electric cord holder assembly as defined in claim 1, wherein the longitudinal ends of said connecting element are beveled.

4. The electric cord holder assembly as defined in claim 1, wherein the inside dimension of said dome-shaped wall of said connecting element is no greater than the outside dimensions of the dome-shaped front walls of said electric cord holder sheaths.

5. The electric cord holder assembly as defined in claim 1, wherein the inside dimension of said dome-shaped wall of said connecting element is less than the outside dimensions of the dome-shaped front walls of said electric cord holder sheaths.

6. The electric cord holder assembly of claim 1, wherein said connecting element comprises at least two angularly-displaced leg segments each having a free end portion and wherein said bosses are provided only on said free end portions so as to increase the flexibility of said connecting element.

7. The electric cord holder assembly of claim 1, wherein said connecting element is T-shaped.

8. The electric cord holder assembly of claim 1, wherein said connecting element is L-shaped.

9. The electric cord holder assembly of claim 1, wherein said connecting element is L-shaped and is adapted for an inside corner.

10. The electric cord holder assembly of claim 1, wherein said connecting element is L-shaped and is adapted for an outside corner.

* * * * *